Oct. 9, 1962  A. SZOCHET  3,057,116
METHOD OF PLANTING TREES
Filed Nov. 7, 1960  2 Sheets-Sheet 1
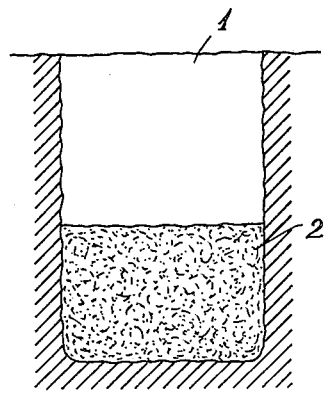
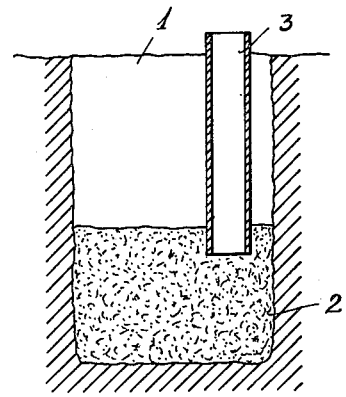
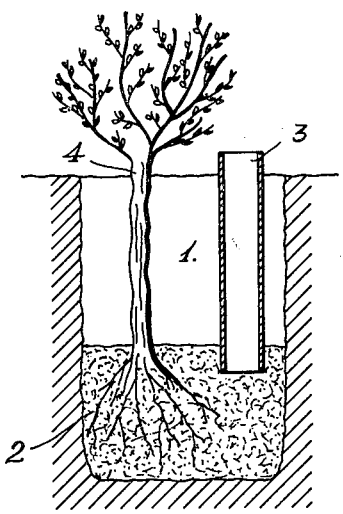
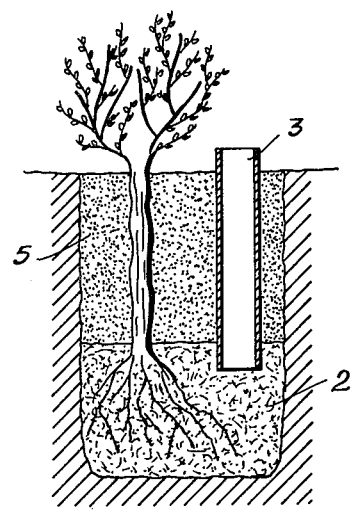
INVENTOR.
Abraham Szochet
BY

Oct. 9, 1962   A. SZOCHET   3,057,116
METHOD OF PLANTING TREES
Filed Nov. 7, 1960   2 Sheets-Sheet 2
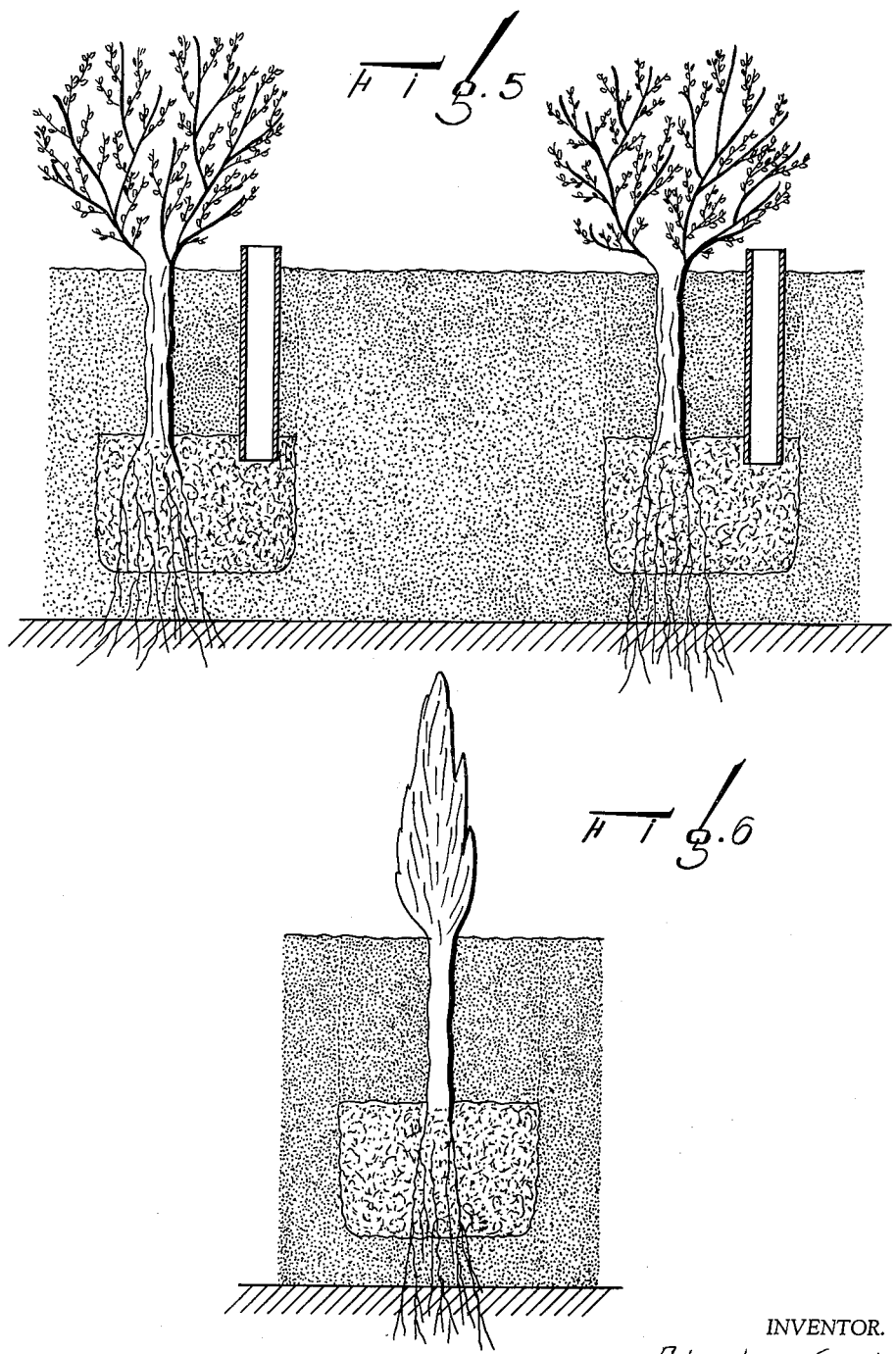
INVENTOR.
Abraham Szochet
BY United States Patent Office 3,057,116
Patented Oct. 9, 1962

3,057,116
METHOD OF PLANTING TREES
Abraham Szochet, Kfar Shmaryahu, Israel
Filed Nov. 7, 1960, Ser. No. 67,689
2 Claims. (Cl. 47—58)

The present invention relates to a method of planting trees and propagating the growth thereof. More particularly the invention relates to the planting of trees in dunes and other waste, sandy location. The invention deals especially with trees which are supplied by nurseries and transplanted at the age of two or three years, i.e. in the state of young trees and not as small seedlings. However, the invention does not exclude the application of the new method to seedlings as well. It is well known that dunes and certain other locations have a top layer of clean, infertile sand but at a depth which varies between 5 and 15 feet good soil is present. Now it is of course practically impossible to clear away the sand and to lay out plantations in the soil in an orthodox manner. Thus land which has been covered by dunes is practically useless and considerable expense has to be spent—in many cases—in order to plant certain hardy plants and shrubs, just to keep the dunes from shifting and encroaching on land under cultivation.

It is the object of the present invention to provide a method for planting trees in dunes and for keeping the plants growing.

It is another object of the invention to provide means for an easy extensive and efficient irrigation of the trees where required.

It is a further object of the invention to provide means which permit a more efficient irrigation, thus saving water.

The invention will become clear from the following description which has reference to the annexed drawing.

In the drawing, FIGURE 1 shows a pit prepared in the top layer of sand for planting a tree therein, FIGURE 2 shows the same pit equipped with a device used for irrigating the particular tree, FIGURE 3 shows a tree planted in the pit and FIGURE 4 shows the pit filled up. FIGURE 5 illustrates two trees as they would appear a few years after planting. FIGURE 6 shows a tree which needs no irrigation or which can be irrigated by means of sprinklers.

In proceeding in accordance with the invention a pit 1 is dug in the sand to a depth of approximately 6 feet (2 metres), however this depth may be varied and will depend largely on soil conditions, kind of the tree to be planted and the experience of the grower in connection with particular soil and species of trees. This pit 1 is now filled up to slightly less than half its depth, say up to 3 feet (90 cm.) with a mixture in which the tree is to be planted. This mixture may be half peat and half soil, or between one and two thirds of peat and the rest sand. Under certain circumstances no peat will be required, say where soil is available which suits a particular kind of fruit bearing tree. The proportion of the mixture of soil, peat, sand etc. may be varied and—in a known way—fertilizer, manure, compost and the like additives may be added. Into the pit 1 is now placed an ordinary concrete pipe of a diameter of approximately 1 ft. (30 cm.), this pipe being marked in FIGURES 2 to 4 with numeral 3. The pipe is open at both ends and extends with its lower end into the mixture 2. Now a young tree 4 (see FIGURE 3) is planted in the mixture 2 beside the pipe 3. Advantageously pipe 3 is located as near as possible to one side of the pit and the tree, as far as the spreading roots will permit, to the opposite side of the pit. Now the mixture 2 is properly packed around the trunk of the tree, just above its roots and is tamped down. The tree is set in the mixture 2 to such a depth that its trunk is almost wholly in the pit and its spreading branches are above ground. In a final step (see FIGURE 4) clean, infertile sand 5 is placed on top of the mixture 2, the top of the sand layer being flush with the sandy ground around the pit.

The tree is now almost wholly embedded with its trunk in the sand 5 and only its branches are above ground.

The layer of sand safeguards the layer 2 against loss of moisture; where there is rain the sand 5 quickly permits the water to percolate through the layer 2, the sand itself drying quickly.

For irrigating a grove or plantation planted in accordance with the new method, water is filled into the pipe 3 beside each tree, this water will slowly percolate down and reach the roots without loss. The trunk will not be moistened, there will be no mud and the plantation will be ready for walking therein or passing therethrough with a wheeled vehicle. It should be understood however that the pipe 3 will be needed only where the plants require watering. Plants which do not require irrigation but thrive under natural conditions (rain and dew), such as vines, do not require the pipe 3.

As a consequence of the new arrangement, water filled in the pipes 3, or rain will penetrate into the layer 2 and sink down through the latter, the roots, naturally will follow and in course of time, instead of spreading, as they ordinarily do will grow practically vertically downwards until they reach the good soil beneath the top layer of sand.

The layer 2 thus serves for keeping the tree alive and furthering its growth until the roots get down to good soil and can draw nourishment and moisture from there. This eventual state is illustrated schematically by FIGURES 5 and 6.

In FIGURE 5 two irrigated trees, say, part of a grove are shown with their roots already down to the layer of soil 6 while FIGURE 6 shows a tree which can rely on rain and needs no artificial irrigation or is irrigated by means of sprinklers from above. In both cases the drawing shows schematically the tendency of the roots to grow deep down, almost vertically, and in both cases the trunk is safeguarded against moisture and thus against rot.

In FIGURE 5 the two trees are shown in a part of dunes which is seen in section. The broken line indicates the pit originally dug for planting the tree, the peat-soil layer appears as a body in the surrounding sand. The roots are seen to have grown through the sand between layer 2 and the soil below the dune. The sandy layer below the layer 2 may be of greater thickness as shown in FIGURES 5 and 6.

It is a special advantage of the new arrangement that the water is most effectively used, being directed to the very location of the roots, thus no water is wasted and on the whole a considerable economy in water is attained. Further, with the new arrangement, automatic devices may be used, so e.g. floats may be arranged in the pipes 3, stopping the flow of water at a predetermined moment.

What I claim is:
1. A method of planting trees in dunes and like local- ities comprising the steps of preparing a pit, filling it partially with a growth promoting mixture, positioning in the pit—near to its wall—a pipe open at both ends and extending with one end into the said growth promoting mixture and with its other end out of the pit, planting a tree in the said growth promoting mixture and covering the growth promoting layer with infertile sand, enclosing the trunk of the tree in the sand.

2. The method claimed in claim 1, wherein the tree is set with its roots in the growth promoting layer, its trunk extending in the pit and its branches being positioned above the ground.

References Cited in the file of this patent

FOREIGN PATENTS 142,953     Great Britain _____ May 20, 1920

OTHER REFERENCES

"Home Gardening Encyclopedia" (Brett), published by Chemical Pub. Co. (N.Y.), 1940. Pages 345 and 346 relied on.

Taylor's Encyclopedia of Gardening, third edition, published by Houghton Mifflin (Boston), 1956. Page 975 relied on.

McCardell: "Subsoil Watering Spurs Tomatoes," published in New York Times (Newspaper), Sunday, May 17, 1959, sec. 2, p. 24x.

Hellriegel: "The Experiment Station at Bernburg, Germany, and its Methods of Sand Culture," published 1894 by U.S. Department of Agriculture in Experiment Station Record, vol. 5, No. 8. Entire article is pages 749 through 774, but only pages 762 through 767 relied on.